INVENTOR
E. F. EGER
BY C.B. Hamilton
ATTORNEY

May 12, 1959

E. F. EGER 2,886,165

ARTICLE BUFFING APPARATUS AND SELECTIVELY
OPERABLE ARTICLE HOLDERS THEREFOR

Filed Aug. 28, 1957

INVENTOR
E. F. EGER
BY
ATTORNEY

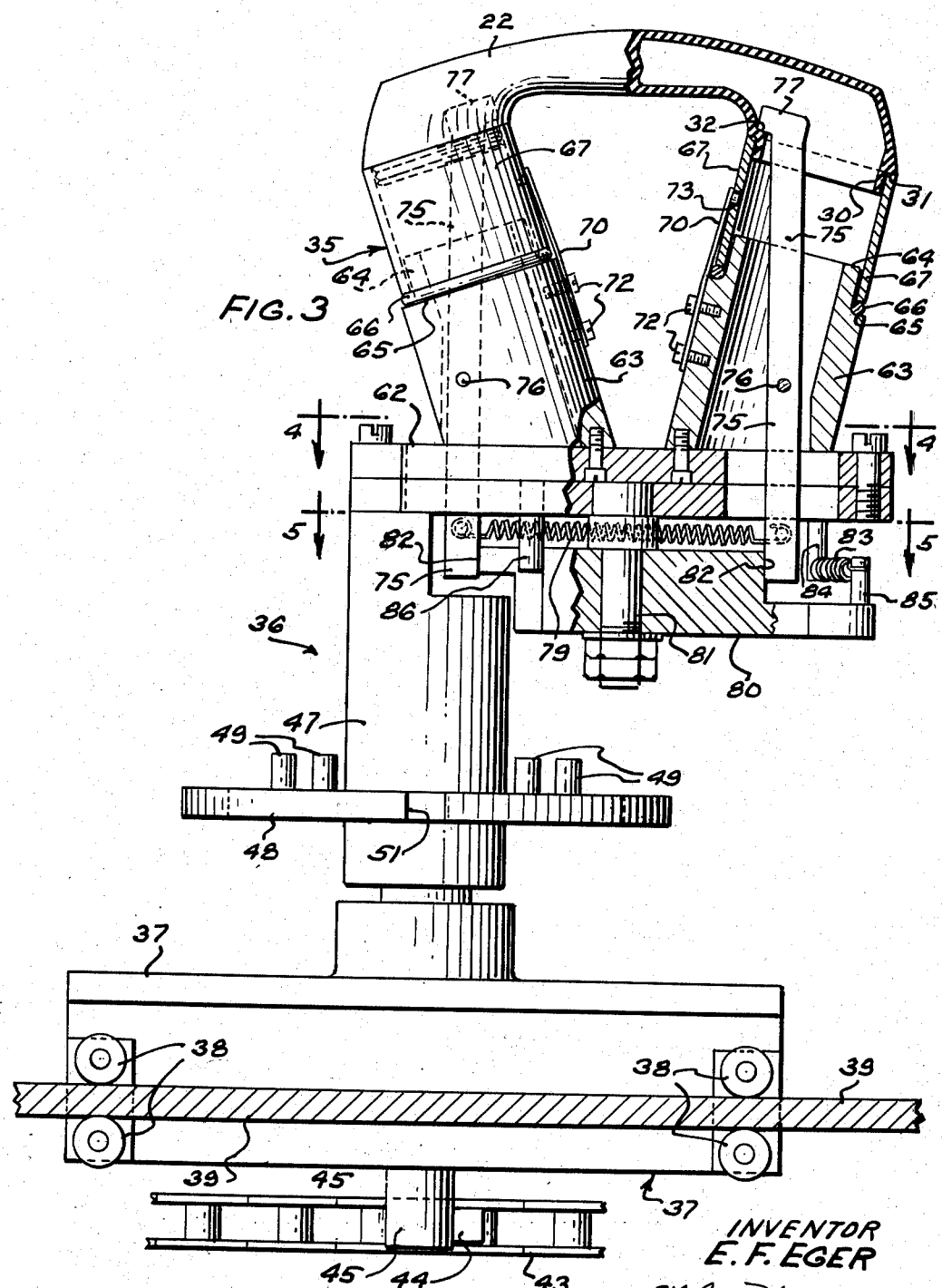

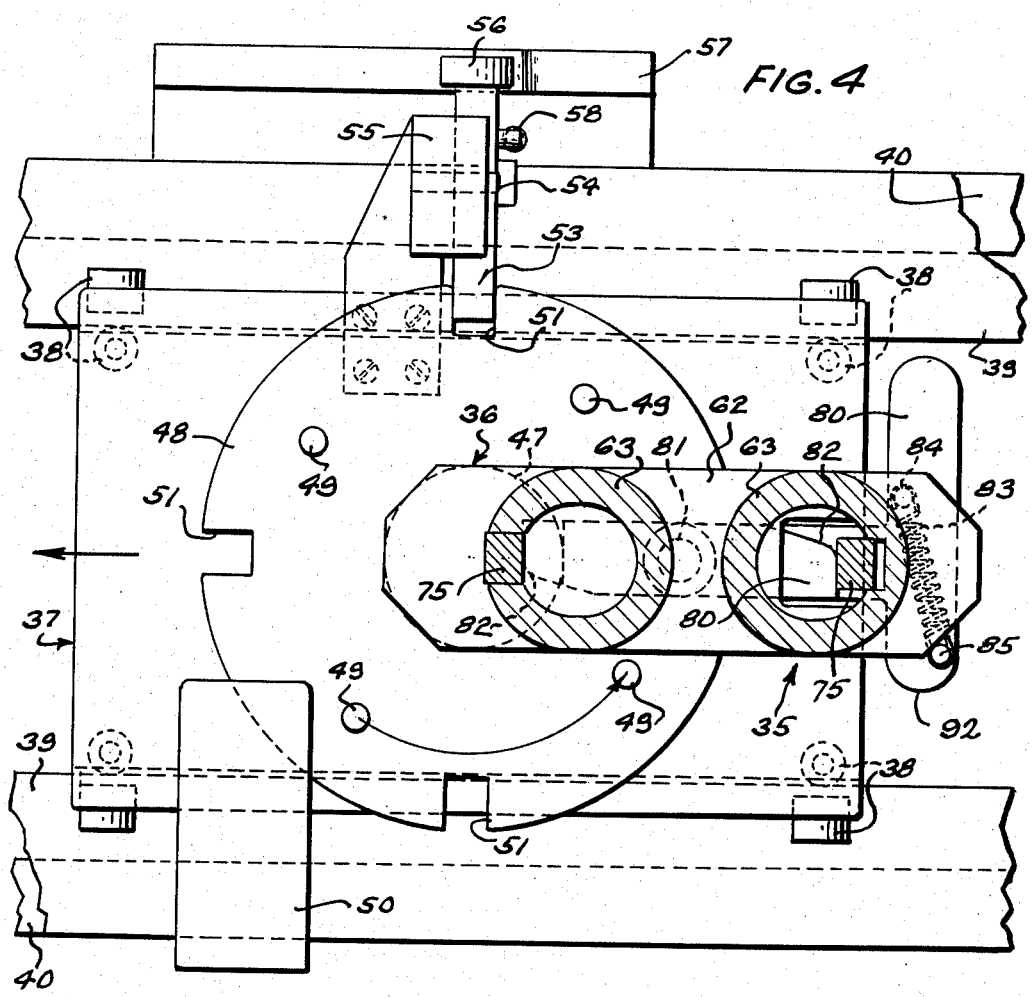
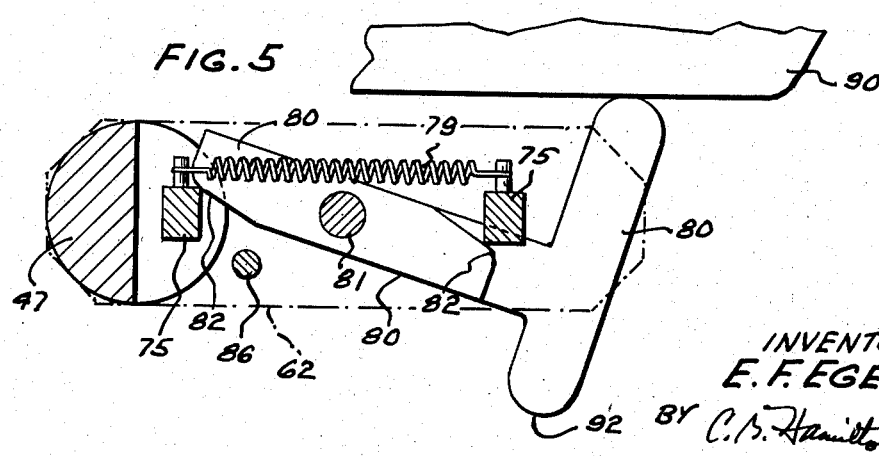

2,886,165

ARTICLE BUFFING APPARATUS AND SELECTIVELY OPERABLE ARTICLE HOLDERS THEREFOR

Edward F. Eger, Indianapolis, Ind., assignor to Western Electric Company, Incorporated, New York, N.Y., a corporation of New York Application August 28, 1957, Serial No. 680,730

10 Claims. (Cl. 198—19)

This invention relates to an article buffing apparatus and more particularly to selectively operable article holders for releasably supporting telephone handset handles and indexing them into different positions for engagement with various buffing rollers of the apparatus to accomplish overall buffing.

An object of the present invention is to provide in an article working apparatus, an article holder capable of carrying an article through a plurality of work stations and for indexing the article into different positions between the stations, and having selectively operable article clamping means for securely holding the article as it passes along work stations and for releasing the article as it moves into a loading and unloading station.

Another object of the invention is to provide in an article buffing machine an article holder having quickly replaceable wear resistant plastic elements for supporting the article in a predetermined position.

An apparatus illustrating certain features of the invention may include a plurality of quickly replaceable article holders formed on turrets which are rotatably mounted on carriers, the carriers being supported on a guide track and moved along a predetermined closed path to advance the articles through a plurality of buffing stations and a loading station. Means are provided to index the turrets between buffing stations to dispose the article in various positions for engagement with buffing rolls at successive buffing stations, and the article holders have selectively operable gripping means for securely holding the articles as they pass through the buffing stations and for releasing the articles at the loading station to permit loading and unloading thereof.

Other objects and advantages of the invention will become apparent by reference to the following detailed descriptions thereof and the accompanying drawings, in which Fig. 1 is a diagrammatic plan view of a buffing apparatus embodying the principal features of the present invention;

Fig. 3 is a fragmentary vertical sectional elevational view of the apparatus taken on line 3—3 of Fig. 2;

Fig. 4 is a fragmentary plan sectional view of the apparatus taken on line 4—4 of Fig. 3; and Fig. 5 is a fragmentary plan sectional view taken on line 5—5 of Fig. 3 and showing a portion of the article holder at the loading station.

Figure 1:
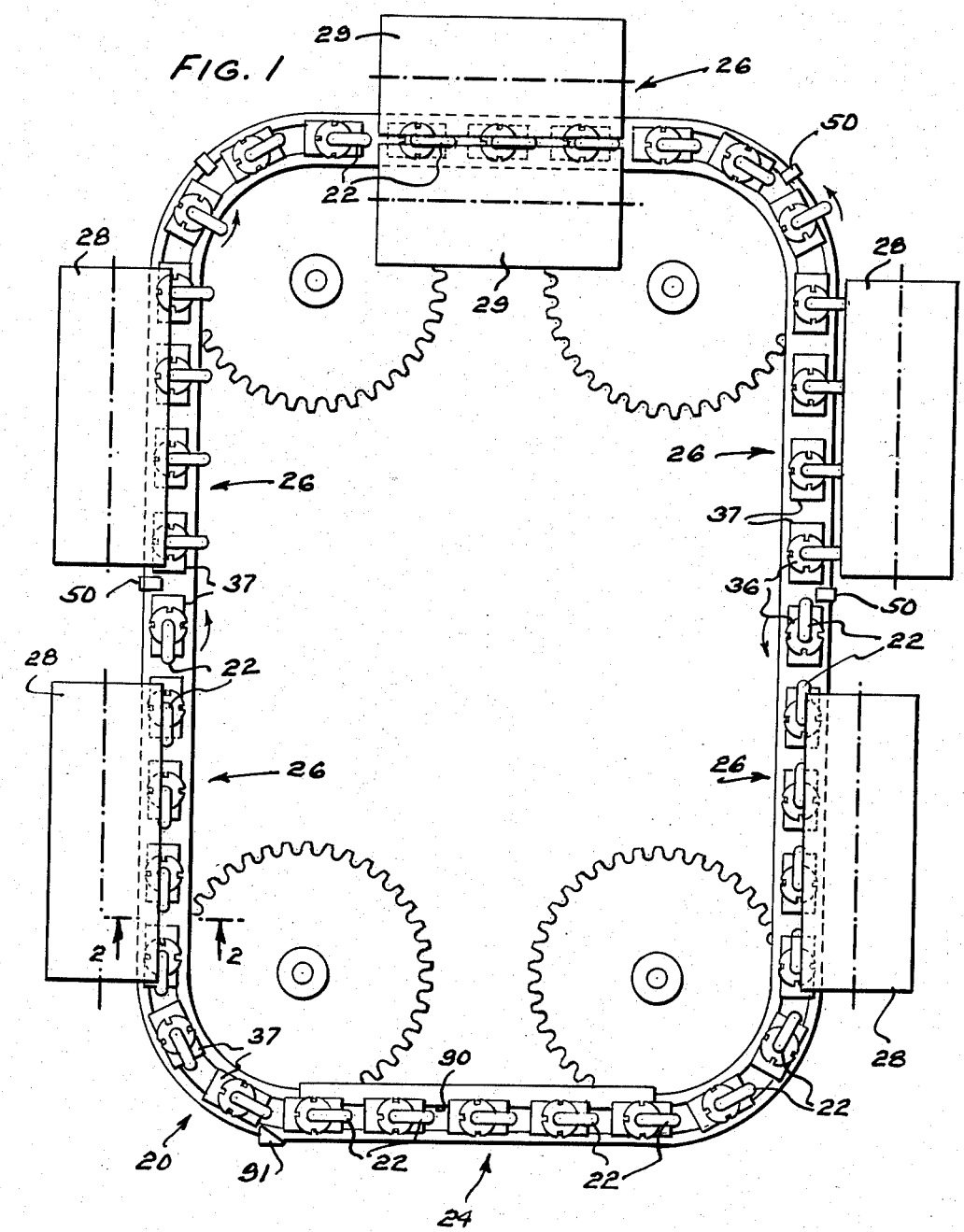

The present apparatus 20 (Fig. 1) is designed to receive articles in the form of telephone handset handles 22 at a loading and unloading station 24, convey them along a predetermined closed path through a plurality of buffing stations 26 and into engagement with buffing rolls 28 and 29 at such stations, index the handles through 90° increments between buffing stations to present different portions of the handles 22 to the buffing rolls, and to return the buffed handles 22 to the unloading station where they are unloaded. The buffing rolls may be located on one side of the conveying means such as buffing rolls 28 or the rolls may be positioned on opposite sides of the conveying means, such as buffing rolls 29.

As seen in Fig. 3 the handles 22 are hollow and have enlarged recessed ends with reduced annular threaded flanges 30 and annular external shoulders 31 disposed in oblique relation to each other and have internal shoulders 32. The handles 22 are adapted to be applied to and supported on a plurality of holders 35 which are fixedly secured to the upper ends of turrets 36 which in turn are mounted on carriers 37 for rotation about vertical axes. Rollers 38 on the carriers ride on tracks 39 which are mounted on a frame 40 of the apparatus and guide the carriers through the predetermined closed horizontal path. An endless chain 43 suitably supported below the carriers 37 and driven by a motor (not shown) has lugs 44 engageable with rollers 45 on the carriers 37 for interconnecting the carriers in close proximity to one another to form an endless conveyor and for advancing the carriers through the loading and the work stations.

Figure 2:
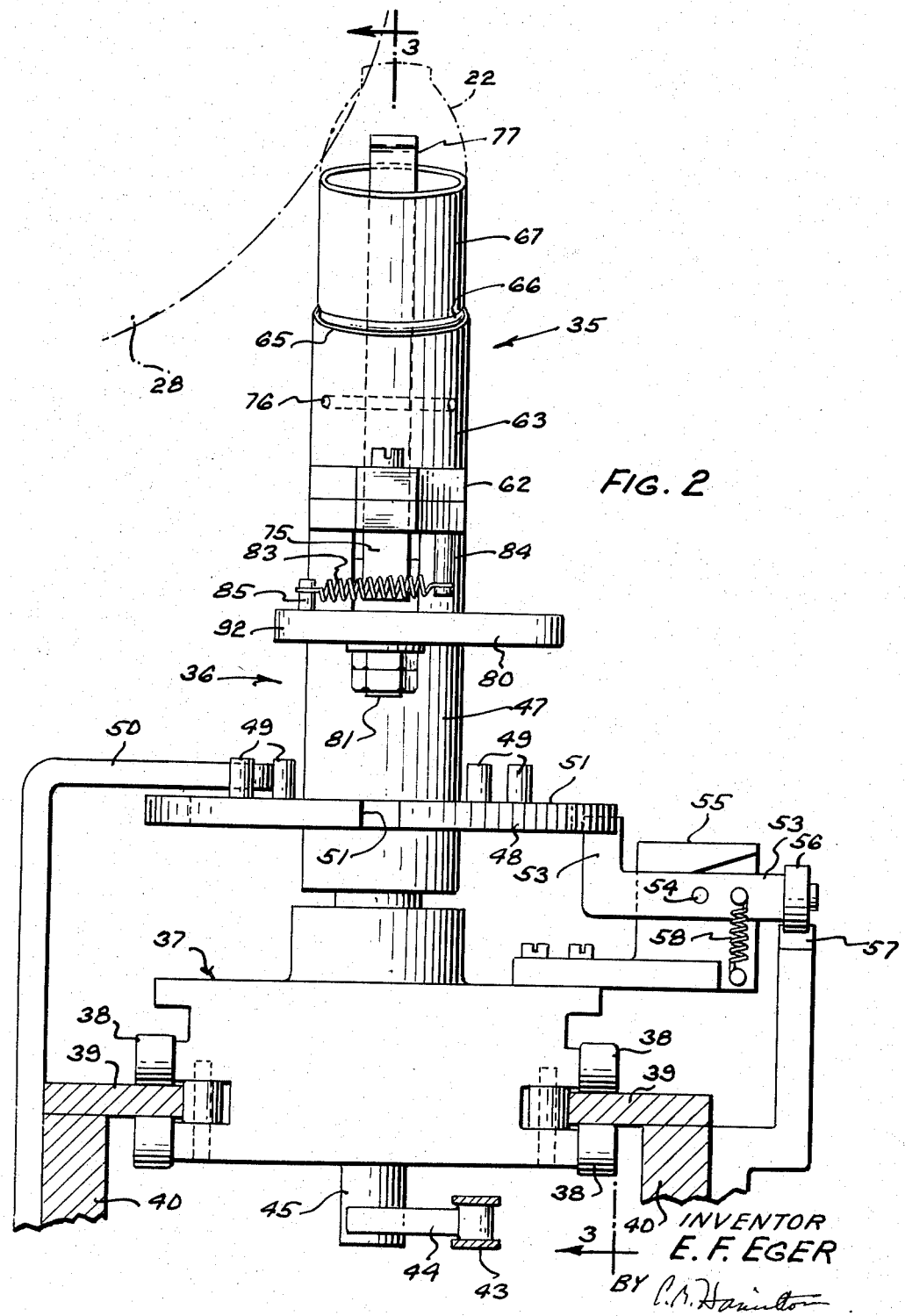
Fig. 2 is an enlarged fragmentary vertical transverse sectional view through the apparatus taken on line 2—2 of Fig. 1 and showing an article holder at a buffing station.

Each of the turrets 36 (Figs. 2 and 3) comprises a rotatable post or column 47 which is journaled at its lower end on the carrier 37 and has an indexing disc 48 secured thereto. The disc 48 has four upwardly directed indexing pins 49 arranged as shown in Fig. 4 which are adapted to engage stationary indexing fingers 50 suitably secured to the frame 40 at predetermined locations between adjacent buffing stations 26. The arrangement of the indexing pins 49 on the turret and the indexing fingers 50 is such that as the carrier 37 passes an indexing finger 50 one of the indexing pins 49 on the turret will engage the side of the indexing finger and will be revolved thereby about the axis of the post 47 and cause the turret 36 to be indexed through an increment of 90° as the pin rides off of the end of the indexing finger.

Each indexing disc 48 is provided with four notches 51 into which the end of a locking pawl 53 (Fig. 2) is adapted to enter to releasably lock the turret in its indexed positions. The locking pawl 53 is pivotally mounted at 54 on a bracket 55 secured to the carrier 37 and the locking pawl 53 has a roller 56 which is adapted to engage stationary cams 57 located in the vicinity of and in a predetermined relation to the indexing fingers 50. These cams are mounted on the frame 40 and are arranged to actuate and effect the disengagement of the locking pawls 53 from the disc 48 prior to and during indexing movements of the turrets 36 by the indexing fingers 50. On completion of the indexing movement the locking pawl 53 is moved into the notch 51 by a spring 58. Thus, the turrets 36 and the telephone handles 22 associated therewith are held against rotation while the handles are being buffed at the several buffing stations 26, and the turrets and handles 22 are indexed through 90° between adjacent buffing stations to present different portions of the handles 22 to the buffing rolls 28 at successive buffing stations.

Each of the holders 35 comprises a horizontally disposed platform 62 secured at one end to the upper end of the post 47 of the turret 36. Extending upwardly from the platform 62 in diverging relation to each other is a pair of tubular members 63 having reduced upper ends 64 and shoulders 65 for receiving rings 66 of rubber or other resilient material and quickly removable sleeves 67 of wear resistant plastic material. The upper ends of the sleeves 67 form obliquely disposed seats for engaging the shoulders 31 and receiving the threaded flanges 30 of the telephone handle 22 to support the handle 22 in a predetermined position suitable for buffing. Clearance is provided between the sleeves 67 and the upper ends 64 of the members 63 whereby the sleeves 67 may be moved laterally or tilted slightly on the resilient rings 65 to receive the ends of the telephone handle 22 and thus facilitate the loading of the handles.

Flat leaf springs 70 are removably secured at one end to the tubular members 63 by screws 72. The other ends of the springs 70 have studs secured thereto that are adapted to extend into slots 73 formed in the sleeves 67. The springs 70 serve to hold the sleeves on the tubular member but yet the stud and slot connection permits limited lateral and self-aligning adjustment of a telephone handle 22 mounted to the sleeves relative to the tubular members. The slots 73 are formed at the mid-section of the sleeves 67; consequently, when the upper portion of a sleeve becomes worn due to the action of the buffing rolls, the spring may be flexed and the sleeve may be withdrawn, reversed and replaced on a tubular member 63 to present an unworn section in the vicinity of the telephone handle. In like manner, new sleeves 67 may be readily substituted for worn out sleeves.

A pair of latches or gripping fingers 75 are positioned within the members 63 and sleeves 67 and are pivotally mounted intermediate their ends to the members 63 at 76. The latches have offset upper ends 77 engageable with the shoulders 32 of the telephone handle to securely hold the handle 22 onto the holder 35 while the handle is being buffed. The lower ends of the latches 75 extend through openings in the platform 62 and are urged toward each other by a spring 79 connected therebetween to rock the latches 75 to an unlatched position to release the telephone handle 22. The latches 75 are moved to a latched position to retain the telephone handle 22 on the holder 35 by a lever 80 pivotally mounted on a supporting pin 81 on the underside of the platform 62. The lever 80 has a pair of opposed cams 82 thereon engageable with the lower ends of the latches 75, and the lever is moved to an operative position to actuate the latches 75 into latched position by a spring 83 (Fig. 2) which is connected at one end to a pin 84 on the platform 62 and at the other end to a pin 85 on the lever 80. A pin 86 on the platform stops the lever in its operative position.

An elongated stationary cam 90 (Figs. 1 and 5) is provided at the loading and unloading station 24 for actuating the levers 80 of succeeding holders 35 to an inoperative position to permit the movement of the latches 75 to their unlatched position to permit the buffed handles 22 to be removed from the apparatus and unbuffed handles to be loaded thereon. In order to facilitate the actuation of the levers 80 into an operative locking position, a cam 91 is positioned at the loading station to engage trailing extremities 92 of the levers 80 as each lever 80 moves from engagement with the cam 90.

From the foregoing disclosure it will be readily understood that with the present article buffing apparatus, articles are loaded onto moving article holders at a loading station and are carried thereby along a predetermined path, that as each holder leaves the loading station the article is securely latched thereto and carried thereby through a plurality of buffing stations, that the holder and article are indexed between adjacent buffing stations to present different portions of the articles to the action of the buffing rolls at successive buffing stations, that the holder returns the article to the loading station in the same position it left the station, and that as the holder enters the loading station the article is unlatched to permit it to be removed therefrom.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for accomplishing overall buffing of telephone handset handles, a conveyor movable through a plurality of buffing stations, indexible holders secured to the conveyor at spaced intervals, means on the holders for locking handset handles to the holders, means for operating the conveyor to carry the holders and the handles thereon through the various buffing stations, means between the buffing stations for indexing the holders into different positions to present different portions of the handles for buffing, means for locking the holders in fixed position on the conveyors between said indexing means, and means at a predetermined position along the conveyor for releasing the locking means on the indexible holders to release the completely buffed handles after they have passed through the buffing stations.

2. In an apparatus for accomplishing overall buffing of telephone handset handles, a conveyor movable through a plurality of buffing stations, holders secured to the conveyor at spaced intervals, quickly replaceable sleeves on the holders for receiving and positioning the handles, means on the holders for locking the handset handles to the sleeves, means for operating the conveyor to carry the holders and handles thereon through the various buffing stations, means for releasably locking the holders in fixed position on the conveyors, means between the buffing stations for releasing said holder locking means and indexing the holders into different positions to present different portions of the handles for buffing, and means at a predetermined position along the conveyor for actuating the handle locking means on the holders to release the completely buffed handles after they have passed through the buffing stations.

3. In an apparatus for performing work on an article, a carrier, means for moving the carrier along a predetermined closed path through a loading and unloading station and a plurality of work stations, a turret mounted on said carrier and indexible to a plurality of positions, means positioned between predetermined stations for indexing the turret into said predetermined positions, a holder on said turret for supporting the article in a predetermined position, means on the holder for clamping the article to the holder, a lever pivotally mounted on the holder for actuating the clamping means, means for moving the lever to a normal operative position to effect the actuation of the clamping means into engagement with the article, and means at the loading and unloading station for actuating the lever to an inoperative position to effect the disengagement of the clamping means from the article.

4. In an apparatus for buffing telephone handset handles, a carrier, means for moving the carrier along a predetermined closed path through a loading station and a plurality of buffing stations of the apparatus, a turret rotatably mounted on said carrier, means positioned between predetermined buffing stations for indexing the turret into predetermined positions, a holder fixedly mounted on the turret and having a pair of seats engageable with the end portions of the telephone handle for supporting the handle, a pair of latches pivotally mounted on the holder for releasably latching the telephone handle thereto, resilient means for moving the latches to an unlatched position for releasing the telephone handle, a lever pivotally mounted on the holder and having cams engageable with the latches, means for moving the lever to a normal operative position to effect the actuation of the latches into latching engagement with the telephone handle, and a stationary cam at the loading station for actuating the lever to an inoperative position to effect the movement of the latches to said unlatched position.

5. In an apparatus for buffing telephone handset handles and having a loading station and a plurality of buffing stations, a combination therewith of a holder having a pair of seats engageable with the end portions of the telephone handle for supporting the handle, a pair of latches movably mounted on the holder for releasably latching the telephone handle thereto, resilient means for moving the latches to an unlatched position to release the telephone handle, a lever pivotally mounted on the holder and having cams engageable with the latches, means for moving the lever to a normal operative position to effect the actuation of the latches into latching engagement with the telephone handle, means for moving the holder along a predetermined closed path through the loading and the buffing stations, and a stationary cam at the loading station for actuating the lever to an inoperative position to effect the movement of the latches to said unlatched position.

6. In an apparatus for buffing telephone handset handles and having a loading station and a plurality of buffing stations, a combination therewith of a holder having a pair of seats engageable with the end portions of the telephone handle for supporting the handle, a pair of latches movably mounted on the holder for releasably latching the telephone handle thereto, resilient means for moving the latches to an unlatched position to release the telephone handle, a lever pivotally mounted on the holder and having cams engageable with the latches, means for moving the lever to a normal operative position to effect the actuation of the latches into latching engagement with the telephone handle, a carrier, means on the carrier for rotatably supporting the holder thereon, means for moving the carrier along a predetermined closed path through the loading and the buffing stations, means positioned between predetermined buffing stations for indexing the holder into predetermined positions, means on the turret for locking the holder in said predetermined indexed positions, and means at the loading station for actuating the lever to an inoperative position to effect the movement of the latches to said unlatched position.

7. In an apparatus having rotating rolls for buffing articles, a holder for carrying an article into engagement with the rolls, said holder having an upwardly directed member with a reduced upper end portion, a sleeve of wear resistant material having a lower end portion telescoped over the upper end portion of the member and supported thereby and having an upper end forming a seat for supporting the article thereon, means for releasably securing the sleeve to the holder, and latching means on the holder for releasably securing the article onto the sleeve.

8. In an apparatus having rotating rolls for buffing telephone handset handles, a holder for carrying the telephone handle past the rolls and into engagement therewith, said holder having a pair of upwardly directed members in diverging relation to each other with reduced cylindrical upper end portions and annular shoulders formed thereon, rings of resilient material encircling the end portions in engagement with said shoulders, sleeves of wear resistant material telescoped over the said end portions and resting on the resilient rings and having upper ends conforming to and engageable with end portions of the telephone handle for supporting the handle thereon, said sleeves having internal diameters larger than the external diameters of the said end portions to permit a slight lateral movement of the sleeves, flexible elements for releasably attaching the sleeves to the members and permitting slight relative movement therebetween to facilitate the seating of a handle on the sleeves, and latching means on the holder for releasably securing the telephone handle onto the sleeves.

9. In an apparatus having rotating rolls for buffing telephone handset handles, a holder for carrying the telephone handle into engagement with the rolls, said holder having a pair of upwardly directed hollow members in diverging relation to each other with reduced cylindrical upper end portions and shoulders formed thereon, rings of resilient material encircling the said end portions of the members in engagement with said shoulders, sleeves of wear resistant plastic material telescoped over the said end portions of the members in engagement with the resilient rings and having ends forming seats engageable with portions of the telephone handle for supporting the handle thereon, said sleeves having recesses and having internal diameters larger than the external diameters of the said end portions of the hollow members to permit slight lateral movement of the sleeves, flexible flat springs secured to the holder and having elements thereon engageable with the sleeves in the recesses thereof for removably retaining the sleeves on the members while permitting slight movement relative thereto, and latching means on the holder extending through the hollow members for releasably securing the telephone handle on the sleeves.

10. In an apparatus having rotary elements for buffing articles, a carrier movable past said buffing elements, a holder on said carrier for carrying an article into engagement with said buffing elements, said holder having an upwardly directed support with a reduced upper end portion and a shoulder formed thereby, a sleeve of wear-resistant material having a lower end portion loosely fitting over the upper end portion of said support and having an upper end forming a seat for supporting the article thereon, a resilient member encircling said reduced end portion of said support and resting on the shoulder of said support for yieldably supporting said sleeve, means for releasably securing the sleeve to the holder for limited movement relative thereto, and latching means on the holder for releasably securing the article onto the sleeve.

References Cited in the file of this patent

UNITED STATES PATENTS

| | | |
|---|---|---|
| 2,376,161 | Maud et al. | May 15, 1945 |
| 2,639,799 | Pikal | May 26, 1953 |